(12) United States Patent
Kieffer

(10) Patent No.: US 7,231,644 B2
(45) Date of Patent: Jun. 12, 2007

(54) OPTIMIZED DELIVERY OF WEB APPLICATION CODE

(75) Inventor: Robert Kieffer, San Francisco, CA (US)

(73) Assignee: AOL LLC, a Delaware limited liability company, Dulles, VA (US)

( * ) Notice: Subject to any disclaimer, the term of this patent is extended or adjusted under 35 U.S.C. 154(b) by 687 days.

(21) Appl. No.: 10/203,043

(22) PCT Filed: Jan. 30, 2001

(86) PCT No.: PCT/US01/02962

§ 371 (c)(1),
(2), (4) Date: Aug. 2, 2002

(87) PCT Pub. No.: WO01/57663

PCT Pub. Date: Aug. 9, 2001

(65) Prior Publication Data
US 2003/0033448 A1    Feb. 13, 2003

(51) Int. Cl.
*G06F 9/44*    (2006.01)

(52) U.S. Cl. .............. 719/331; 709/203; 709/219

(58) Field of Classification Search ............ 719/331, 719/332; 709/203, 219; 707/10, 104.1; 715/500.1, 513
See application file for complete search history.

(56) References Cited

U.S. PATENT DOCUMENTS

| | | | | |
|---|---|---|---|---|
| 5,572,643 | A | 11/1996 | Judson | 395/793 |
| 5,835,914 | A | 11/1998 | Brim | 707/206 |
| 5,995,975 | A | 11/1999 | Malcolm | 707/103 |
| 6,012,068 | A * | 1/2000 | Boezeman et al. | 707/104.1 |
| 6,151,599 | A | 11/2000 | Shrader et al. | 707/9 |
| 6,223,224 | B1 * | 4/2001 | Bodin | 709/236 |
| 6,230,157 | B1 | 5/2001 | Malcolm et al. | 707/100 |
| 6,282,548 | B1 | 8/2001 | Burner et al. | 707/104 |
| 6,289,333 | B1 | 9/2001 | Jawahar et al. | 707/2 |
| 6,327,608 | B1 | 12/2001 | Dillingham | 709/203 |
| 6,336,137 | B1 | 1/2002 | Lee et al. | 709/219 |
| 6,353,839 | B1 | 3/2002 | King et al. | 707/513 |
| 6,353,923 | B1 | 3/2002 | Bogle et al. | 717/4 |
| 6,360,236 | B1 | 3/2002 | Khan et al. | 707/526 |
| 6,362,836 | B1 | 3/2002 | Shaw et al. | 345/744 |

(Continued)

OTHER PUBLICATIONS

Kong et al. "Mitigating server-side congestion in the internet through pseudoserving" 1999 IEEE, pp. 530-544.*

(Continued)

*Primary Examiner*—Van Nguyen
(74) *Attorney, Agent, or Firm*—Michael A. Glenn; Glenn Patent Group

(57) ABSTRACT

Application code for deployment to a client over a data link is optimized to minimize download time by supplying only the application code with a particular object that is required by the object. In a web application that includes multiple pages, the HTML and JAVASCRIPT are scanned to identify code resources called by a particular web page. When all called resources are identified, they are extracted and concatenated into a single resource file. When the page is downloaded to the client, the import file is included with the page. The import file may be cached so that it need only be downloaded once, rather than being downloaded every time the page is requested. The invention is suitable for use with other interpreted scripting languages.

42 Claims, 3 Drawing Sheets

U.S. PATENT DOCUMENTS

| | | | |
|---|---|---|---|
| 6,370,573 | B1 | 4/2002 | Bowman-Amuah ......... 709/223 |
| 6,427,149 | B1* | 7/2002 | Rodriguez et al. ............. 707/10 |
| 6,615,253 | B1* | 9/2003 | Bowman-Amuah ......... 709/219 |
| 6,687,737 | B2* | 2/2004 | Landsman et al. .......... 709/203 |
| 6,880,123 | B1* | 4/2005 | Landsman et al. ....... 715/500.1 |

OTHER PUBLICATIONS

Byers et al. "Acessing multiple mirror sites in parallel: using Tornado codes to speed up downloads" 1999 IEEE, pp. 275-283.*

*Logic Web: Enhancing the Web with Logic Programming*; Andrew Davison, and Seng Wai Loke; Dec. 23$^{rd}$, 1996.

*LISP—a Language for Internet Scripting and Programming*: Timothy J. Hickey, Peter Norvig, and Kenneth R. Anderson.

*SurveyWiz and FactorWiz: JavaScript web pages that make HTML forms for research on the Internet*; M.H. Birnbaum; Behavior research Methods, Instruments, & Computers; May 2000.

*Decrypting JavaScript*; K. Chambers; Application Development Advisor; Jul.-Aug. 2000.

*Creating a multiple-choice self-marketingengine on the internet*; T.W. Ng; International Journal of Engineering Education; 2000.

*A dynamic select component for JavaScript*; S. Johnson; Dr. Dobb's Journal; Jan. 2000.

*Generalized event handling in JavaScript*; A. Hildyard; WEB Techniques; Feb. 1999.

*Building object-oriented web pages with SilverStream*; M. Pfeifer; WEB Techniques; Feb. 1999.

*Adding style and behaviour to Web pages with a dash of Spice*; D. Raggett; Computer Networks and ISDN Systems; Apr. 1998.

*Architecture, design, and development of an HTML/JavaScript Web-based group support system*; N.C Romano, Jr.; J.F. Nunamaker, Jr.; R.O. Briggs; and D.R.Vogel; Journal of the American Society for Information Science; May 15, 1998.

*Orthogonal extensions to the WWW user interface using client-side technologies*; A. Fox, S.D. Gribble, Y. Chawathe, A.S. Polite, A. Huang, B. Ling and E.A. Brewer; Proceedings of the ACM Symposium on user Interface Software and Technology. 10$^{th}$ Annual Symposium; Oct. 14-17, 1997.

*Responsive interaction for a large Web application: the Meteor Shower architecture in the WebWriter II editor*; A.Crespo, Bay-Wei Chang, and E.A. Bier; Computer Networks and ISDN Systems; Sep. 1997.

*Animation with layers in DHTML. Innovative examples from noted designers*; J.S. Hamlin; WEB Techniques; Dec. 1997.

*Jump starting your site Dynamic HTML. Active content without page updates*; R. Dobson; WEB Techniques; Dec. 1997.

*Using JavaScript to write JavaScript*; N.R. Radovanovic; WEB Techniques; Sep. 1997.

*Using JavaScript to create interactive Web pages*; T. Tessier; Dr. Dobb's Journal; Mar. 1996.

*Snow Net; An Agent-Based Internet Tourist Information Service*; A. Erni, and M.C. Norrie; Institute for Information Systems Federal Institute of Technology (ETH).

*Optimization of Printer Font Download Using Font Character Download on Demand*, IBM 1989.

*The Java Language Specification, Chapter 12.*

\* cited by examiner

OPTIMIZED DELIVERY OF WEB APPLICATION CODE

BACKGROUND OF THE INVENTION

1. Field of the Invention

The invention relates to the field of data processing. More particularly, the invention relates to a method of optimizing application code for delivery to a client over a data connection, in which only those parts of the application code needed by a particular object within the application are delivered to the client with the object, thus minimizing download time.

2. Description of Related Art

In the world of web applications, developers face severe limitations when trying to deploy client-side functionality. In general, good development practice pushes developers toward the creation of a rich base of generalized code to draw from. This code base frequently becomes very diverse in the functionality it supports and very complicated in the dependencies, as more and more code is written that depends on the code that existed prior to it. This generalized code base is extremely powerful as it allows the rapid development of applications. And, in the traditional world of desktop applications, where memory and bandwidth are secondary constraints, deploying such a rich and weighty system has been moderately straightforward.

Web applications, on the other hand, are strictly limited in the amount of code that can be delivered to the client. A web application is little more than a set of web pages that support different functionalities. For example, a web presentation application may have one page for each of the following functions:

viewing the users' presentations;
editing a presentation; and
viewing a presentation.

Thus, there is a dramatic limitation when it comes to delivering the client side functionality. A traditional desktop application may take 30 Mbytes of code to run—a conservative estimate. On a 56K modem line, this much information takes at least ten minutes to transfer to the client. It is unreasonable to expect the typical web user to wait this long for a page to load.

This leads to the problem addressed by this invention—that of deploying code to the client in an efficient and optimized manner.

The prior art provides various strategies and systems for optimizing application code in the web environment. For example, B. Muschett, W. Tracey, S. Woodward, Method and system in a computer network for bundling and launching hypertext files and associated subroutines within archive files, U.S. Pat. No. 6,026,437 (Feb. 15, 2000) describe a method and system in a computer network in which a HTML file having tags that point to particular applets is bundled into an archive file with the applets and the data associated with the applets. In response to a client request to download the hypertext file; the file, the applets, and associated data are downloaded as a single archive file. While the described invention reduces download time by increasing data packaging efficiency and eliminating the need for multiple data requests to the server for multiple objects; the single object created, incorporating the hypertext page, the applet or applets and the associated data, results in a large data object, which itself, requires substantial download time. Furthermore, the described system makes no attempt to reduce the amount of data downloaded; it merely packages and transmits it more efficiently. Moreover, since the hypertext file and the applet are packaged together in the same archive file, both applet and hypertext file must be downloaded every time the client requests the hypertext file.

C. Bryant, T. Goin, T. Moos, D. Steele, Apparatus and method for increasing the performance of interpreted programs running on a server, U.S. Pat. No. 6,141,793 (Oct. 1, 2000) describe an apparatus and method in which interpreted scripts, such as CGI scripts are consolidated into a single process, similar to a library of interpreted code routines. When the process is to be executed, the interpreted process forks its self and has the resulting child process run the already compiled interpreted code. In this way, the interpreted code need only be compiled once, rather than compiling over and over again. While the described invention improves the performance of the interpreted program by eliminating redundant processing steps, it is not concerned with optimizing the interpreted code, or providing only those code sections that are necessary for the task at hand. Furthermore, the described invention is concerned only with server side programs, it has nothing to do with interpreted programs and scripts run on the client side, and it is unconcerned with minimizing download time by reducing the amount of code to be downloaded to and interpreted on the client.

There exists, therefore a need in the art for a method of deploying application code to a client in an efficient and optimized manner. It would be highly desirable to reduce the amount of data to be downloaded by optimizing code in such a way that only that code needed by a particular object, for example a web page, is supplied to the client with the object, so that download time is minimized. Furthermore, it would be desirable to cache the application code on the client, so that the optimized code need only be downloaded once, instead of every time the object is requested from the server.

SUMMARY OF THE INVENTION

The invention provides a procedure for optimizing application code for deployment to a client over a data link, wherein only the code needed by a given object within said application is supplied to the client with said object, so that download time is greatly minimized.

In a preferred embodiment, the invention is directed to web applications, in which the application includes one or more web pages, based on HTML files. The HTML code may contain embedded blocks of code written in an interpreted scripting language such as JAVASCRIPT. Additionally, the HTML code may refer to separate import files of code, also written in a language such as JAVASCRIPT. The web pages may include one or more functionalities that depend on the JAVASCRIPT code.

Prior to deployment, the application code, both the HTML and the JAVASCRIPT are scanned, using a suitable parsing tool. During parsing, code entry points, points in the code that call resources such as methods and functions, are identified. All available resources, in the HTML, and the JAVASCRIPT are identified, and a resource list, that includes a description of every resource available, is created. The call path at each entry point is followed and all resources required by the web page are identified. The required resources are extracted and concatenated into a new import file, after which the HTML code is updated to refer to the newly created file.

During use, the newly created import file is downloaded to the client with the accompanying web page. The import file is cached on the client, eliminating the necessity of downloading the import file more than once.

DETAILED DESCRIPTION

Figure 1:
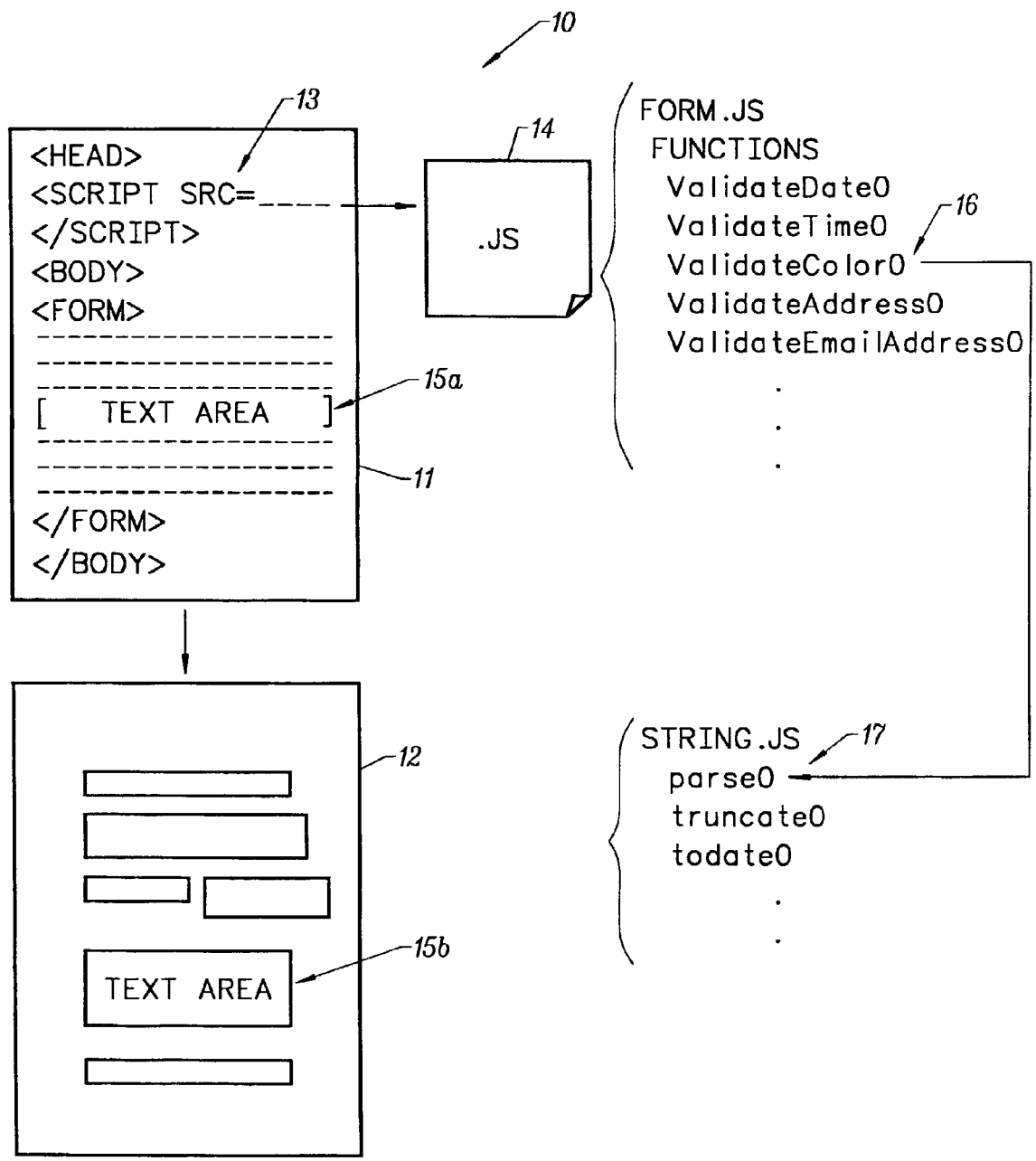
FIG. 1 provides a diagram illustrating code dependencies in a typical web application.

FIG. 1 provides a diagram illustrating code dependencies in a page from a typical web application 10. In response to a client request, a file of HTML code 11 is transmitted to the client. Upon processing the HTML code, the client displays to the user a web page 12. As previously indicated, web pages may include various functionalities. They are given these functionalities by calling various resources, the resources consisting of code blocks that perform specific tasks. Generally, resources may be functions, methods, procedures or sub-routines. Resources may be written either in a compiled language such as JAVA or C++, or they may be written in an interpreted scripting language such as JAVASCRIPT or visual basic scripting (VBSCRIPT). In its preferred embodiment, the invention is directed primarily to code written in these scripting languages, which are supported by most web browsers. Code for the resources may exist as code blocks embedded in the HTML code (not shown) or the HTML may contain tags that refer 13 to an import file of code 14. As indicated in FIG. 1, the import file may be a file of JAVASCRIPT code. The example page shown in FIG. 1 is a registration page in which the user enters information such as name, address, and e-mail address in text fields or text areas. The underlying HTML contains code for a text area 15a. Upon processing the code, the client, or web browser, displays a corresponding text area 15b, according to the specifications of the HTML code 15a. As in this example, HTML forms generally include some form of validation script to ensure that the user is entering the correct type of information in the form field in the correct format. In this case, the text area 15b is an address field and the underlying code 15a calls a function, ValidateAddress() 16 to validate data entered into the field by the user. The function ValidateAddress() is found in the JAVASCRIPT import file FORM.JS referenced by the HTML file. The ValidateAddress() function further calls, a method, parse() 17, found in another JAVASCRIPT import file, STRING.JS, along with a number of other methods that are not needed by the web page. Depending on the application, in order to obtain a few lines of code needed for a single web page, a client may need to download hundreds or even thousands of lines of code.

Due to the nature of web applications, the optimal solution is to deliver only that code which is explicitly needed by any given web page. This dramatically reduces the amount of code that needs to be deployed and, consequently, the amount of time a web user spends waiting for a page to finish loading.

Figure 2:
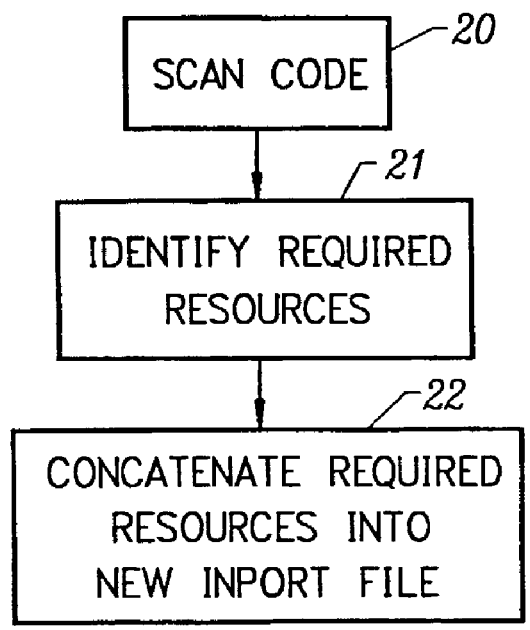
FIG. 2 provides a top-level block diagram of a procedure for optimizing web application code for download to a client, according to the invention.

The invention works by creating a dependency tree of the code that is required to implement the functionality needed on a certain web page. As FIG. 2 shows, the "root" of this tree can be found by parsing the HTML 20 that is served up to the client to discover which resources are called by the page in response to various events. With these functions as entry points, it is then determined which functions they, in turn, call. This second set of resources is in turn scanned, and so on until a complete set of all the required code is obtained 21. Once the set of required code is determined, that code is delivered to the client by concatenating all of the required resources into a new import file 22, which is served up to the client with the web page. The invented code optimization is typically implemented as a final development step prior to deployment of the web application.

Code Scanning (20)

Preferably, a code-parsing tool is used to automatically scan through the application code to generate the set of required code. This has the advantage that it dynamically creates a dependency tree, or a list of resources that is ordered according to code dependencies. Various parsing tools are suitable for the invention: for example, the RHINO JAVASCRIPT engine, provided by AOL-Netscape of Mountain View Calif., or scripts written in a language such as PERL. Any parsing tool that supports IO, collections, arrays and hash maps and that is capable of manipulating files would be suitable. Additionally, various notation systems can be used that allow developers to mark which resources (functions) a particular block of code requires as they are developing the code.

Figure 3:
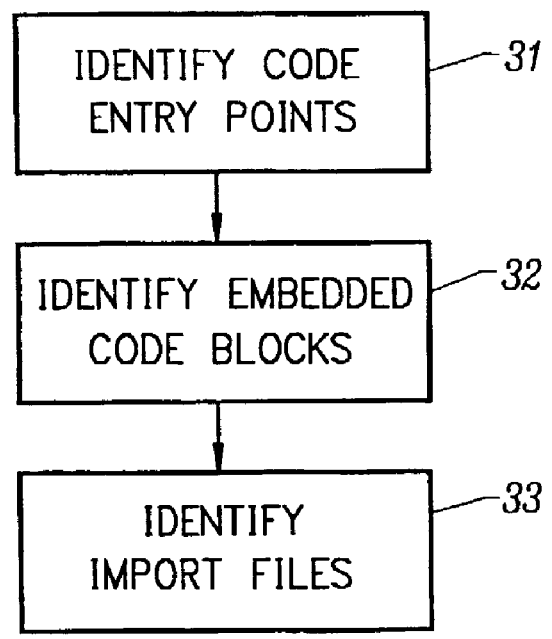
FIG. 3 provides a block diagram of a sub-procedure for scanning application code from the procedure of FIG. 2, according to the invention.
Figure 4:
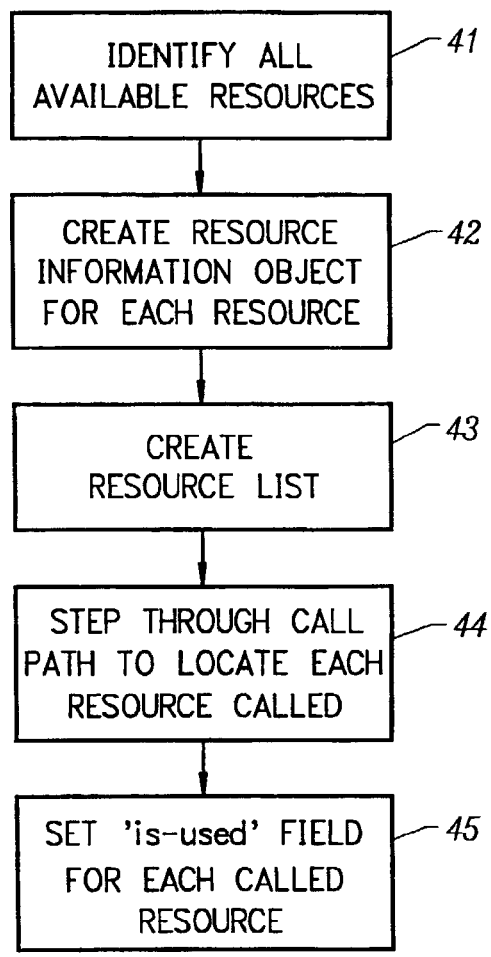
FIG. 4 provides a block diagram of a sub-procedure for identifying all resources called by a particular page from a web application, from the procedure of FIG. 2, according to the invention.
Figure 5:
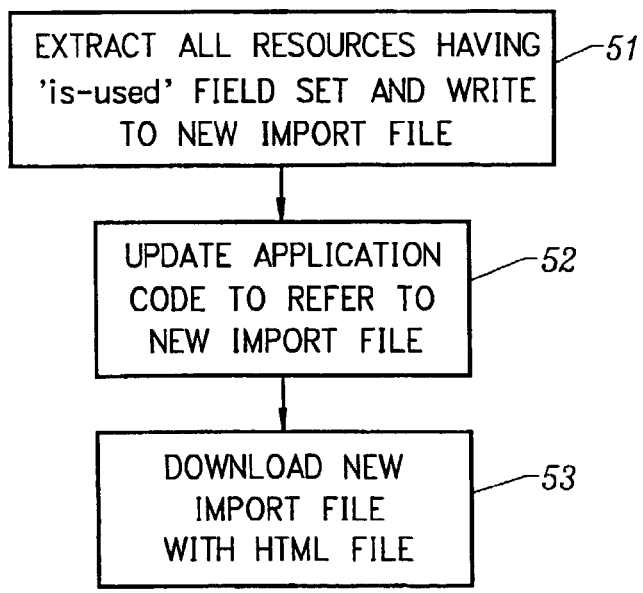
FIG. 5 provides a block diagram of a sub-procedure for providing a new import file containing only the application code needed by the web page of FIG. 4, according to the invention.

As FIG. 3 shows, scanning the code first involves identifying entry points in the code 31. As described above, these entry points consist of initial resource calls, primarily in the HTML code. Entry points may include:

HTML tags that incorporate JAVASCRIPT statements;

Actions associated with various web page elements, such as forms; and

DOM events (document object model) events. Typically, DOM events are found in JAVASCRIPT import files.

Resource calls may be for functions, methods, procedures or sub-routines or any code block that performs a specific task. While the invention is described in relation to JAVASCRIPT, such description is exemplary only. In fact, the invention is equally applicable to other interpreted scripting languages such as VBSCRIPT.

In addition to identifying entry points, the parsing tool also identifies blocks of JAVASCRIPT code embedded in the HTML 32 and identifies all import files 33 required by the web page.

Identifying Required Resources (21)

Having identified code entry points, embedded script blocks and import files, the parsing tool is used to identify all available resources 41 found in the HTML code, the embedded script code and the import files. As each resource is located, a resource information object is created for the resource 42. The information object is a data object containing a description of the resource, and may also include the code with which the resource is implemented. In the preferred embodiment of the invention the resource information object includes:

resource name;

methods called by the resource;

optionally, the code implementing the resource;

optionally, the source file for the resource;

an 'is-used' field; and an 'is-real' field.

Various data structures well known to those skilled in the art are suitable for the implementation of the resource information object. As indicated above, the resource information object may include the actual code implementing the resource, or it may merely reference the source file where the resource is to be found. Both the 'is-used' and the 'is-real' fields are Boolean. The function of these two fields is explained in detail below. A resource list is created 43 by creating an array of all the resource information objects. The array is ordered according to the sequence in which the resource is encountered in the application code. While the array may be used as the final resource list, in the preferred embodiment of the invention, a hash map of the array is provided as a lookup to optimize the resource list. In this hash map, keys consist of the resource names and values consist of the corresponding resource information objects for the named resources. In addition to the actual resources, virtual functions may be created. Certain of the entry points may call more than one resource, or they may have more than one associated action. At a later step of the procedure, the HTML code is updated to refer to the import file containing all of the required resources. For those entry points that call more than one function, or that have more than one associated action, it is necessary to create a placeholder in the code. Thus, virtual functions are created that incorporate the actions or resource calls associated with that entry point. As previously indicated, the resource information object includes a Boolean 'is-real' field. In information objects describing a virtual function, the 'is-real' field is left unset. Thus, the 'is-real' field is used to distinguish between actual resources and virtual. First identifying all available resources in this manner provides an important optimization to the subsequent step of locating and extracting resources required by the web page.

Following creation of the resource list, the parsing tool steps through the call path at each previously identified entry point to identify those resources that are actually used by the web page 44. It should be noted that the previously created resource list included all available resources, plus any virtual resources created. The current step identifies those resources from all resources that are actually used. As the resources are identified, the 'is-used' field of the corresponding information object is set 45, thus indicating that the corresponding resource is one that is required by the web page. Each call path is followed until one of:

- a resource is encountered that doesn't call any further resources;
- a resource is encountered that calls a system function;
- a resource is encountered that already has the 'is-used' field set.

Write to New File (22)

Once the required resources have been located and marked, they are written to a new import file. Those resources having the 'is-used' field set are extracted and concatenated into a new file 51. The resources must be ordered in the new file in a manner that preserves the original dependencies. In one embodiment of the invention, a dependency tree is created. However, since the information object for each resource refers to the resources called by that resource, this information may be utilized to order the resources in a manner equivalent to that of a dependency tree.

Subsequently, the original HTML code is updated to refer to the new import file 52. Thus, a single, compact import file, incorporating only the application code required by the web page is downloaded with the page when it is requested 53. It is important to note that for any given page, this process generates a complete set of the code needed. The process of determining and delivering the required code can be done on a per-page-request basis, but in most cases the code needed by a particular page remains constant. If this is the case, the process can be optimized by caching the required code for each page at "build" time. For example, when installing a page that edits a presentation slide, the build process could generate a corresponding script file dedicated to that page. An important advantage of caching the required code in this fashion is that it allows browser clients to cache the code using their built in caching mechanisms. Thus, when multiple requests for a page are made, the code only needs to be delivered the first time.

The invention is embodied both as a procedure and as a computer program product embodied on a computer-usable medium that includes computer readable code means for performing the procedure. The computer-usable medium may be a removable medium such as a diskette or a CD, or it may also be a fixed medium, such as a mass storage device or a memory.

Although the invention has been described herein with reference to certain preferred embodiments, one skilled in the art will readily appreciate that other applications may be substituted without departing from the spirit and scope of the present invention. Accordingly, the invention should only be limited by the claims included below.

The invention claimed is:

1. A procedure for optimizing application code for deployment to a client over a data link, wherein only the code needed by a first object within said application code is supplied to the client with said first object, wherein said application code comprises a web application, said web application further comprising at least one import file of code, said procedure comprising the steps of:

analyzing said first object;

without requiring any input from any user, automatically determining all external code needed by said first object in order to implement its functionality, wherein automatically determining all external code needed by said first object in order to implement its functionality further comprises identifying any embedded code blocks and said at least one import file, and identifying all resources needed by said first object in order to implement its functionality contained therein;

extracting all the determined external code needed by the first object in order to implement its functionality from said any embedded code blocks and said at least one import file, wherein said any embedded code blocks and said at least one import file from which the needed code is extracted further contains unneeded code, which is not extracted;

concatenating all the extracted external code needed by the first object in order to implement its functionality into a single file;

wherein said single file contains only the code required by said first object in order to implement its functionality; and transmitting said single file to the client.

2. The procedure of claim 1, wherein said first object comprises a web page, said web application including at least one web page that includes at least one functionality, said web page comprising a file of HTML (hypertext markup language) code, said web page including at least one embedded code block written in a scripting language.

3. The procedure of claim 2, wherein said scripting language is comprises any of JAVASCRIPT and VBSCRIPT.

4. The procedure, of claim 2, wherein said external code is located in at least one of:
said at least one embedded code block; and
said at least one import file.

5. The procedure of claim 3, wherein said steps of analyzing said first object, and without requiring any input from any user, automatically determining all external code needed by said first object in order to implement its functionality further comprises the steps of:
scanning said HTML code;
scanning said at least one embedded code block;
scanning said at least one import file; and
identifying entry points contained therein.

6. The procedure of claim 5, wherein said entry points comprise any of:
HTML tags that incorporate JAVASCRIPT statements;
actions associated with web page elements; and
DOM (document object model) events.

7. The procedure of claim 6, wherein said actions associated with web page elements include HTML form actions.

8. The procedure of claim 5, wherein automatically determining all external code needed by said first object in order to implement its functionality further comprises the steps of:
creating a resource information object for each needed resource; and
creating at least one list of said information objects.

9. The procedure of claim 8, wherein said resources comprises any of:
functions;
a virtual function;
methods;
procedures;
sub-routines; and
any code block that performs a specific task.

10. The procedure of claim 9, wherein said virtual function comprises:
a placeholder in said HTML code, wherein said virtual function comprises at least one of:
instructions and resources contained in said embedded code blocks;
wherein a web page element invokes a plurality of said functions.

11. The procedure of claim 8, wherein said resource information object comprises:
resource name;
methods called by said resource;
optionally, implementation of said resource;
optionally, source file;
an 'is-used' field; and
an 'is-real' field.

12. The procedure of claim 11, wherein said 'is-used' and said 'is-real' fields are Boolean fields, said 'is-used' field being set to denote a resource required by said web page and said 'is-real field' left unset to denote a virtual function.

13. The procedure of claim 12, wherein said step of creating at least one list of said information objects comprises the step of:
creating an array of said resource information objects.

14. The procedure of claim 13, wherein said step of creating at least one list of said information objects further comprises the step of creating a hash map of said information objects, wherein keys in said hash map comprise resource names and corresponding values comprise information objects for the named resources.

15. The procedure of claim 13, wherein said step of identifying all resources needed by said first object in order to implement its functionality comprises the steps of:
for each entry point, following a call path to identify required resources;
for each resource encountered on said call path, setting said 'is-used' field.

16. The procedure of claim 15, wherein said call path is followed until any of:
a resource is encountered that doesn't call any other resources;
a resource is encountered that calls a system function;
a resource is encountered that already has the 'is-used' field set.

17. The procedure of claim 16, wherein said step of concatenating all extracted external code needed by the first object in order to implement its functionality into a single file comprises the steps of:
writing each resource for which the 'is-used' field is set to a new import file, wherein said resources are written to said new import file in the order that they occur in said application code; and
updating said application code to refer to said new import file.

18. The procedure of claim 1, wherein analyzing said first object further comprises using an analysis tool incorporating one from a group consisting of:
IO support; and
support for collections, arrays, and hash maps.

19. The procedure of claim 18, wherein said analysis tool comprises one of:
a PERL script; and
a JAVASCRIPT engine.

20. The procedure of claim 1, wherein said single file is held in said client's cache after downloading, so that it need be downloaded only once.

21. The procedure of claim 1, wherein said optimization is performed prior to deployment of said web application.

22. At least one computer readable storage medium containing a computer program product for optimizing application code for deployment to a client over a data link, wherein only the code needed by a first object within said application code is supplied to the client with said first object, wherein said application code comprises a web application, said web application further comprising at least one import file of code, said computer program product comprising:
program code for analyzing said first object;
program code for, without requiring any input from any user, automatically determining all external code needed by said first object in order to implement its functionality, wherein automatically determining all external code needed by said first object in order to implement its functionality further comprises identifying any embedded code blocks and said at least one import file, and identifying all resources needed by said first object in order to implement its functionality contained therein;
program code for extracting all the determined external code needed by the first object in order to implement its functionality from said any embedded code blocks and said at least one import file, wherein said any embedded code blocks and said at least one import file from which the needed code is extracted further contains unneeded code, which is not extracted;

program code for concatenating all the extracted external code needed by the first object in order to implement its functionality into a single file;

wherein said single file contains only the code required by said first object in order to implement its functionality; and program code for transmitting said single file to the client.

23. The computer program product of claim 22, wherein said first object comprises a web page, said web application including at least one web page that includes at least one functionality, said web page comprising a file of HTML (hypertext markup language) code, said web page including at least one embedded code block written in a scripting language.

24. The computer program product of claim 23, wherein said scripting language comprises any of JAVASCRIPT and VBSCRIPT.

25. The computer program product of claim 24, wherein said external code is located in at least one of:
said at least one embedded code block; and
said at least one import file.

26. The computer program product of claim 24, wherein said program code for analyzing said first object, and without requiring any input from any user, automatically determining all external code needed by said first object in order to implement its functionality further comprises program code for:
scanning said HTML code;
scanning said at least one embedded code block;
scanning said at least one import file; and
identifying entry points contained therein.

27. The computer program product of claim 25, wherein said entry points comprise any of:
HTML tags that incorporate JAVASCRIPT statements;
actions associated with web page elements; and
DOM (document object model) events.

28. The computer program product of claim 26, wherein said actions associated with web page elements include HTML form actions.

29. The computer program product of claim 25, wherein said program code for automatically determining all external code needed by said first object in order to implement its functionality further comprises program code for:
creating a resource information object for each needed resource; and
creating at least one list of said information objects.

30. The computer program product of claim 29, wherein said resources comprises any of:
functions;
a virtual function;
methods;
procedures;
sub-routines; and
any code block that performs a specific task.

31. The computer program product of claim 30, wherein said virtual function comprises:
a placeholder in said HTML code, wherein said virtual function comprises at least one of: instructions and resources contained in said embedded code blocks, wherein a web page element invokes a plurality of said functions.

32. The computer program product of claim 29, wherein said resource information object comprises:
resource name;
methods called by said resource;
optionally, implementation of said resource;
optionally, source file;
an 'is-used' field; and
an 'is-real' field.

33. The computer program product of claim 32, wherein said 'is-used' and said 'is-real' fields are Boolean fields, said 'is-used' field being set to denote a resource required by said web page, and said 'is-real field' left unset to denote a virtual function.

34. The computer program product of claim 33, wherein said program code for creating at least one list of said information objects comprises program code for:
creating an array of said resource information objects.

35. The computer program product of claim 34, wherein said program code for creating at least one list of said information objects further comprises program code for creating a hash map of said information objects, wherein keys in said hash map comprise resource names and corresponding values comprise information objects for the named resources.

36. The computer program product of claim 34, wherein said program code for identifying all resources needed by said first object in order to implement its functionality further comprises program code for:
for each entry point, following a call path to identify required resources;
for each resource encountered on said call path, setting said 'is-used' field.

37. The computer program product of claim 36, wherein said call path is followed until any of:
a resource is encountered that doesn't call any other resources;
a resource is encountered that calls a system function;
a resource is encountered that already has the 'is-used' field set.

38. The computer program product of claim 37, wherein said program code for concatenating all extracted external code needed by the first object in order to implement its functionality into a single file comprises program code for:
writing each resource for which the 'is-used' field is set to a new import file, wherein said resources are written to said new import file in the order that they occur in said application code; and
updating said application code to refer to said new import file.

39. The computer program product of claim 22, wherein said program code for analyzing said first object further comprises program code for using an analysis tool incorporating one from a group consisting of:
IO support; and
support for collections, arrays, and hash maps.

40. The computer program product of claim 39, wherein said analysis tool comprises one of:
a PERL script; and
a JAVASCRIPT engine.

41. The computer program product of claim 22, further comprising program code for holding said single file in said client's cache after downloading, so that it need be downloaded only once.

42. The computer program product of claim 22, wherein said at least one computer readable medium comprises at least one of:
fixed storage medium; and
a removable storage medium.

* * * * *

UNITED STATES PATENT AND TRADEMARK OFFICE
CERTIFICATE OF CORRECTION

| | |
|---|---|
| PATENT NO. | : 7,231,644 B2 |
| APPLICATION NO. | : 10/203043 |
| DATED | : June 12, 2007 |
| INVENTOR(S) | : Robert Kieffer |

It is certified that error appears in the above-identified patent and that said Letters Patent is hereby corrected as shown below:

Title Page,
Add Section -- (60) RELATED U.S. APPLICATION DATA:

Provisional Application No. 60/180,378, filed on Feb. 04, 2000. --

Signed and Sealed this

Thirtieth Day of September, 2008

JON W. DUDAS
*Director of the United States Patent and Trademark Office*